United States Patent
Nielsen

[19]

[11] Patent Number: 6,096,254

[45] Date of Patent: Aug. 1, 2000

[54] METHOD OF INJECTION MOLDING A SPRING-LIKE SPLIT TUBULAR DEVICE HAVING OVERLAPPING LONGITUDINAL EDGES

[76] Inventor: H. Kristian Nielsen, 1910 10th Ave. West, Seattle, Wash. 98119

[21] Appl. No.: 09/033,578

[22] Filed: Mar. 3, 1998

Related U.S. Application Data

[62] Division of application No. 08/387,103, Feb. 10, 1995, Pat. No. 5,722,117.

[51] Int. Cl.⁷ .............................. B29C 45/00; B29C 45/40
[52] U.S. Cl. ........................ 264/237; 264/328.1; 264/336
[58] Field of Search ..................... 264/230, 237, 264/342 R, 348, 328.1, 336, 328.16, DIG. 40, DIG. 67, DIG. 71; 425/555; 249/57

[56] References Cited

U.S. PATENT DOCUMENTS

| | | |
|---|---|---|
| 616,746 | 12/1898 | Taylor . |
| 1,008,604 | 11/1911 | Lake . |
| 2,017,772 | 10/1935 | Schildgen et al. .................. 264/342 R |
| 2,134,020 | 10/1938 | Anson . |
| 2,239,180 | 4/1941 | Kupfer . |
| 2,425,245 | 8/1947 | Johnson . |
| 3,072,955 | 1/1963 | Mitchell . |
| 3,083,366 | 3/1963 | Franges . |
| 3,119,160 | 1/1964 | Hoppeler . |
| 3,620,896 | 11/1971 | Glasgow .............................. 264/342 R |
| 3,635,382 | 1/1972 | Wilson . |
| 3,655,860 | 4/1972 | Leiter et al. ............................ 264/237 |
| 3,981,043 | 9/1976 | Curry . |
| 4,071,063 | 1/1978 | Russell . |
| 4,158,250 | 6/1979 | Ringwald . |
| 4,590,640 | 5/1986 | Enersen . |
| 4,662,884 | 5/1987 | Stensaas . |
| 4,846,519 | 7/1989 | Leonard . |
| 4,867,444 | 9/1989 | Castillo . |
| 4,873,043 | 10/1989 | Meyers .................................... 264/237 |
| 5,199,135 | 4/1993 | Gold . |
| 5,199,758 | 4/1993 | Howell . |
| 5,360,584 | 11/1994 | Hansen et al. ........................... 264/230 |
| 5,474,732 | 12/1995 | Korthoff et al. ........................ 264/230 |
| 5,722,117 | 3/1998 | Nielsen . |

FOREIGN PATENT DOCUMENTS

| | | |
|---|---|---|
| 193790 | 2/1957 | Austria . |
| 468025 | 9/1950 | Canada . |
| 611423 | 9/1926 | France . |

OTHER PUBLICATIONS

Photograph and inventor notes regarding "Hand Saver" product purchased in Aug., 1992.

Photograph and inventor notes regarding "Baggle" product purchased in 1988.

(List continued on next page.)

*Primary Examiner*—Jill L. Heitbrink
*Attorney, Agent, or Firm*—Christensen O'Connor; Johnson & Kindness PLLC

[57] ABSTRACT

The invention relates to multi-use thin-walled tubular devices having a longitudinal slit with non-cutting overlapping edges and corners curved in a manner to provide scissor-like entry-ways at either open end and methods of making and using such devices. The device is rigid lengthwise yet flexible in circumference and has renitent qualities such that the overlapping edges are spring-like. All surfaces and edges are smooth so that the devices are user-friendly and comfortable when used as handle grips for holding and carrying built-in handles of certain carrying objects, attachable handles for carrying items without built-in handles, hand-held exercisers, physical hand rehabilitation devices, hand-manipulated fasteners, and hand-manipulated separators. The dimensions of the device, the material used, and the method of construction may be adapted for the specific application. The preferred method of making is injection molding and requires a specially-designed mold form. It has been discovered that selection of appropriate material and careful control of the molding parameters produces spring-like split tubular devices which develop the desired degree of overlap of the longitudinal edges during the post-mold shrinkage period.

11 Claims, 6 Drawing Sheets

OTHER PUBLICATIONS

Photograph and inventor notes regarding "The Bag Handle" product purchased in 1992.

Photograph and inventor notes regarding "Mano Comoda (Italian) market Bag Grips (English)" product purchased in 1986.

Photograph and inventor notes regarding "Bag Carrying Handle" product purchased in 1993.

Photograph and inventor notes regarding "Pac–A–Sac" product purchased in 1988.

Photograph and inventor notes regarding "Easy Carry Bag Handle" product purchased in 1990.

Photograph and inventor notes regarding "Grocery Tote" product purchased in 1989.

Photograph and inventor notes regarding "Get a Grip" product purchased in Dec., 1993.

Photograph and inventor notes regarding "Shopping Caddy" product purchased in Nov., 1993.

Photograph and inventor notes dated Apr. 9, 1994, regarding "Eggsercizer" product.

Photograph and inventor notes dated Apr. 9, 1994, regarding "Gripp Ball" product.

Photograph and inventor notes dated Apr. 9, 1994, regarding "Magic Moon Ball" product.

Photograph and inventor notes dated Apr. 9, 1994, regarding "Finger Strengthener" product.

Photograph and inventor notes dated Apr. 9, 1994, regarding "Strong Sam" product.

Photograph and inventor notes dated Apr. 9, 1994, regarding "Sorbothane Sports Grip" product.

Photograph and inventor notes dated Apr. 9, 1994, regarding "Oriental Exercise Balls" product.

Photograph and inventor notes dated Apr. 9, 1994, regarding "Digi–Flex System" product.

Photograph and inventor notes dated Apr. 9, 1994, regarding "Fixed Hand Grip" product.

Photograph and inventor notes dated May 26, 1994, regarding "Action Hand Exerciser" product.

Photograph and inventor notes dated May 26, 1994, regarding "Be OK Bleedproof Therapy Putty" product.

Photograph and inventor notes dated Apr. 9, 1994, regarding "Multi–Grip Upper Body Exerciser" product.

Photograph and inventor notes dated Apr. 9, 1994, regarding "Power–Web Hand Excerciser" product.

Photograph and inventor notes dated Apr. 9, 1994, regarding "Deluxe Power–Grip Hand Exeriser" product.

Photograph and inventor notes dated Apr. 9, 1994, regarding "Bennett Ergonomic Hand Exerciser" product.

Photograph and inventor notes dated Apr. 9, 1994, regarding "Cats Paw" product.

METHOD OF INJECTION MOLDING A SPRING-LIKE SPLIT TUBULAR DEVICE HAVING OVERLAPPING LONGITUDINAL EDGES

This application is a divisional of U.S. patent application Ser. No. 08/387,103, filed Feb. 10, 1995 now U.S. Pat. No. 5,722,117.

BACKGROUND OF THE INVENTION

1. Field of the Invention

The invention relates to multi-use thin-walled, split tubular devices which are rigid lengthwise yet flexible in circumference wherein all edges are smooth and non-cutting and the longitudinal edges along the split overlap each other. Preferably, the edges are all smoothly rounded and each end of the longitudinal edges have rounded, non-cutting corners to form scissor-like entry-ways at either open end. More particularly, the invention relates to, but is not limited to, split tubular devices which can be used in various manners such as handle grips for holding and carrying built-in handles of certain carrying objects, attachable handles for carrying items without built-in handles, hand-held exercisers, physical hand rehabilitation devices, hand-manipulated fasteners, and hand-manipulated separators.

2. Related Technology

A number of devices today which are configured for carrying objects by hand have built-in handles associated therewith. Examples include plastic shopping bags, soft-sided luggage, purses and handbags, backpacks, carry-on garment bags and other similar items. In some instances, the built-in handles are uncomfortable and may cause injury to the hand of the user. Typical of such are the flexible handle loops found on the plastic bags used in many grocery stores. These bags are referred to herein as "plastic T-shirt bags" or "T-shirtbags" in accord with the commonly used expression in the bag industry based on the shape of the bags as manufactured.

Over the past several years, plastic T-shirt shopping bags have increasingly been used in groceries and other retail establishments in place of paper sacks without handles. Lower cost to the retailer has been a primary motive for the shift. Despite environmental concerns with the use of plastic, consumers often appreciate the convenience of the built-in handles on the plastic T-shirt bags. At present, plastic T-shirt bags are the most common type of grocery or retail bag in use.

Typically, plastic bags are constructed of a very thin polymer film which lacks rigidity. Therefore, when the contents of the bag are comparatively heavy, the handle loops exert a considerable pressure on the hand of the person carrying the bag. The problem is compounded when more than one bag is carried in one hand.

Heavily loaded plastic T-shirt plastic bags press deeply into the fingers and sides of the user's hand. Not only can this situation be painful, but joint and muscle strain and diminished blood circulation in the hand may result. Accordingly, it may be difficult for a person, and particularly for a young or elderly person, to keep the hand closed tightly around the plastic handle loops for even short periods of time.

To overcome some of the inherent problems with hand-held plastic bags, various handle grips for carrying such bags (and other items with built-in handles) have been developed in the art. One known handle grip is in the shape of a horseshoe which, when held, functions as a large hook to hold multiple plastic bags. Another handle grip design is shaped much like a hot dog bun. The handle includes an elongated member having a recess that extends along one side of the elongated member. The recess receives the plastic bag handles and the elongated member is held in the user's hand with the recess opening away from the hand.

A significant problem with these existing handle designs is that the plastic T-shirt bag handles do not stay retained within the handle grip. In particular, the lengthwise opening along one side permits the handle of the carrying device to unintentionally slip through when the handle grip is released by the user. Usually, the handle grip will fall to the ground or into the plastic bag when released such that the plastic bag handle is no longer retained. Thus, when set down, the plastic bags are likely to tip over and the handles separate such that the contents can spill out. Additionally, some of the current handle grips have slits with sharp edges or are poorly designed and molded such that hand discomfort may occur from the handle grip itself.

In addition, some handle grips in use today are fashioned from materials which may be toxic if put in the mouth. This is unsafe because children or pets may be likely to come in contact with the handle grips. Another problem is that some of the currently-used handle grips may rupture when too much load is applied. The ruptured handle grip may splinter into sharp-edged shards which could cause injury. Another problem with some contemporaneous handle grips is the fact that they are not washable in boiling water without some damage occurring thereto.

It would be advantageous to provide a handle grip for attaching to a carrying device handle that did not permit inadvertent release of the carrying device handle. It would also be desirable to provide a handle grip with no sharp edges which is comfortable to hold and carry. It would be a further advantage to provide a handle grip that could withstand significant flexure in circumference without rupturing. It would also be desirable to have a handle grip made of non-toxic material that could be washed in boiling water without impairment.

It is also noted that attachable handles are marketed for use with objects that do not have a built-in handle associated therewith. Typical of such an attachable handle is an elongate rod or tube-shaped member which has an endless cord attached to the side of the member and configured such that the cord may be wrapped around the object to be carried and the elongate member passed through the loop of the cord so as to effect an equivalent half-hitch around the object. However, such contemporaneous attachable handles require producing a different part than the handle grips described above. It would be desirable if an attachable handle could be achieved merely by adding an endless cord or strap to the handle grip device described above.

It is also noted that hand-held exercisers are commonly used by individuals to exercise and strengthen the gripping ability of the hand. However, such exercisers are fashioned as devices which are typically quite unlike conventional handle grips or conventional attachable handle devices as described above. It would be desirable if a hand-held exerciser could be produced configured approximately the same as a handle grip, thus permitting the utilization of the same manufacturing techniques and facility as utilized for the handle grip.

It is also noted that physical hand rehabilitation devices are in common use today for therapy of the hands of persons afflicted with disease or injuries. Variously sized devices are utilized for such rehabilitation devices, and such devices are generally quite dissimilar in configuration to contemporaneous handle grip devices. It would be desirable if a physical hand rehabilitation device could be produced configured approximately the same as a handle grip device, thus permitting the utilization of the same manufacturing techniques and facility as utilized for the handle grip.

It is also noted that elongate fastening devices for side-by-side fastening of two or more elongate objects, such as wires or the edge cords of nets, together are in common use today. However, such fastening devices are typically designed differently than contemporaneous handle grip devices. It would be desirable if a fastening device could be produced configured approximately the same as a handle grip, thus permitting the utilization of the same manufacturing techniques and facility as utilized for the handle grip.

It is also noted that a three-wire separator is in use today, configured so as to separate three wires, in a side-by-side fashion, from each other. Such devices are quite foreign in configuration to contemporaneous handle grip devices. It would be desirable if a three-wire separator could be produced configured substantially the same as a handle grip, thus permitting the utilization of the same manufacturing techniques and facility as utilized for the handle grip.

SUMMARY AND OBJECTS OF THE INVENTION

It is an object of the present invention to provide a spring-like split tubular device which is rigid lengthwise yet flexible in circumference having overlapping longitudinal non-cutting edges with non-cutting curved corners that form scissor-like entry-ways at each open end . Such devices are adaptable for various uses but can, nevertheless, be produced utilizing the same manufacturing techniques and facility to thereby minimize costs. It is appreciated that the specific dimensions will vary depending on the specific application, i.e., end use, contemplated.

It is also an object of the present invention to provide a spring-like split tubular device which is rigid lengthwise yet flexible in circumference having overlapping longitudinal non-cutting edges with non-cutting curved corners that form scissor-like entry-ways at each open end adaptable for various uses which can be color coded and/or marked with surface indicia for identifications or messages.

It is another object of the present invention to provide a spring-like split tubular device which is rigid lengthwise yet flexible in circumference having overlapping longitudinal non-cutting edges with non-cutting curved corners that form scissor-like entry-ways at each open end adaptable for various uses configured such that it can withstand significant flexure in circumference without rupturing.

Yet another object of the present invention is to provide a spring-like split tubular device which is rigid lengthwise yet flexible in circumference having overlapping longitudinal non-cutting edges with non-cutting curved corners that form scissor-like entry-ways at each open end adaptable for use as a removably attachable handle grip that may be utilized to cooperatively engage the built-in handle of a carrying bag, or similar object, so as to provide a comfortable and convenient handle grip which does not permit inadvertent release of the carrying bag built-in handle.

A further object of the present invention is to provide a spring-like split tubular device which is rigid lengthwise yet flexible in circumference having overlapping longitudinal non-cutting edges with non-cutting curved corners that form scissor-like entry-ways at each open end adaptable for use as a removably attachable handle for objects which do not have built-in handles to provide a convenient and comfortable means of carrying such objects.

An additional object of the present invention is to provide a spring-like split tubular device which is rigid lengthwise yet flexible in circumference having overlapping longitudinal non-cutting edges with non-cutting curved corners that form scissor-like entry-ways at each open end adaptable for use as a hand-held exerciser for exercising the hands, configured such that it can be squeezed and relaxed repetitively by the hand of the user.

Another object of the present invention is to provide a spring-like split tubular device which is rigid lengthwise yet flexible in circumference having overlapping longitudinal non-cutting edges with non-cutting curved corners that form scissor-like entry-ways at each open end adaptable for use as a physical hand rehabilitator for individuals suffering from disease or injuries of the hand.

Yet another object of the present invention is to provide a spring-like split tubular device which is rigid lengthwise yet flexible in circumference having overlapping longitudinal non-cutting edges with non-cutting curved corners that form scissor-like entry-ways at each open end adaptable for use as a "no-tools" fastener configured so as to permit the side-by-side positioning and securing of two elongate objects such as wires or the border cords of nets.

A further object of the present invention is to provide a spring-like split tubular device which is rigid lengthwise yet flexible in circumference having overlapping longitudinal non-cutting edges with non-cutting curved corners that form scissor-like entry-ways at each open end adaptable for use as a three-way separator configured so as to permit separation and securement of elongate objects such as wires in a side-by-side fashion within three adjacent compartments.

Additional objects and advantages of the invention are set forth hereinbelow in the detailed description, or will be appreciated by the practice of the invention.

To achieve the foregoing objects, and in accordance with the invention as embodied and broadly described herein, a spring-like split tubular device which is rigid lengthwise yet flexible in circumference having overlapping longitudinal non-cutting edges with non-cutting curved corners that form scissor-like entry-ways at each open end is provided which allows carrying of plastic T-shirt bags, or other carrying objects having similar built-in handles, carrying of objects without built-in handles, exercising of hands, and separation and securement of elongate objects in a simple and uncomplicated manner.

It should be understood that a split tubular device in accord with the present invention has a variety of applications. The dimensions of the device, the material used, and the method of construction may be adapted for the specific application. The material must have renitent qualities, however, such that, although the device is deformable by applied pressure, the pressure is resisted somewhat. Because of the overlapping longitudinal edges, the device closes over itself when circumferentially flexed. Moreover, when the pressure is removed, the device substantially returns to its original shape and position, i.e., the device possesses a "spring-like" quality. The selected material should preferably be able to withstand significant flexure in circumference without rupturing and should be machinable and injection moldable. In addition, the material is preferably non-toxic and washable in boiling water.

The invention comprises, in its basic embodiment, a spring-like split tubular member having two ends and a boundary wall fashioned from a renitent material. The device is rigid lengthwise yet flexible in circumference. The boundary wall of the split tubular member defines an inner chamber. A longitudinal slit fashioned along the length of the wall defines a first and a second longitudinal edge extending the length of the split tubular member. The first longitudinal edge overlaps the second longitudinal edge such that access to the chamber is between the overlapping edges. Access to the chamber is also available at the two ends of the split tubular member. All edges of the device are smooth and non-cutting. Most preferably, all of the edges are rounded to a radius equal to half the wall thickness of the boundary wall.

Additionally, the ends of the overlapping longitudinal edges are preferably configured to have smooth, non-cutting corners curved in a manner that forms a scissor-like entry-way for facilitating insertion of an object into the chamber. The radius of the curve of the corners forming the entry-way is preferably proportional to the outer diameter of the split tubular device such that the larger devices have larger-sized curved, rounded corners to thereby facilitate insertion of larger objects, if desired. Because of the overlapping configuration of the longitudinal edges, it can be seen that a curved-cornered entry-way formed on the first longitudinal edge will overlap the second edge when the split tubular member is unstressed, i.e., when the split tubular member is in its original shape and position.

The first, and likely to be the most common, application of the spring-like split tubular device within the scope of the present invention is as a handle grip for conveniently retaining, and permitting comfortable holding and carrying of, handles of an elongate nature which are attached to many types of carrying objects. As a handle grip, the spring-like split tubular device is used to improve the comfort and safety of holding and carrying objects having built-in handles including, but not limited to, plastic T-shirt bags, pails, canvas or string bags, briefcases, backpacks, and luggage with carrying straps. For the sake of convenience, only the use of the spring-like split tubular device as a handle grip for plastic T-shirt bags will be discussed in great detail. It can be appreciated that use with other carrying objects having similar built-in handles will be comparable.

The handles of a plastic T-shirt bag can be inserted through the round-cornered entry-way. The handles can then be easily pulled to slide through the longitudinal slit of the overlapping edges such that a portion of the handles is retained within the inner chamber of the split tubular member and the remaining portions of the handle extend from both ends of the chamber. The spring-like split tubular device having overlapping edges, thus, becomes a stable and comfortable handle grip permitting the bag to be held and carried by the user for longer periods of time without hand fatigue, pain or injury.

The handles of one or more T-shirt bags can be inserted through the longitudinal slit and into the chamber of the spring-like split tubular device where they will remain secured until such time as the handles are pulled back through the entry-way and the longitudinal slit. Thus, when the loaded T-shirt bags are set down and the split tubular device is released, the T-shirt bag handles remain secured within the chamber such that the handles do not spread apart permitting the bag contents to be spilled. In this manner, the handles are not subject to inadvertent release when the handle grip is not being squeezed in a person'ns hand. This feature is especially beneficial for the blind user.

The number of T-shirt bags being carried will depend on the user's comfort. Factors such as the weight and bulk of the contents of the bags may affect how many bags can be comfortably carried. Also, the size of the spring-like split tubular device will affect how many handles will fit within the chamber. It will be appreciated, however, that the device will typically accommodate as many T-shirt bags as a user is likely to desire to carry in one hand. It will be appreciated that the chamber of the spring-like split tubular device of the present invention can also serve as a receptacle for holding one or more folded or rolled-up plastic T-shirt bags or other thin film bags. Thus, a user can easily transport bags for later use with the handle grip as a small, compact package carried in a pocket or purse. It will be appreciated that other objects could also be easily carried within the spring-like split tubular device. For example, a pet leash or other type of strap or cord could be rolled up within the chamber and stored or carried.

It is also possible to form a convenient package out of two of the spring-like split tubular devices. Two split tubular devices having the same diameter can be placed end to end with the longitudinal slits and curved-corner entry-ways aligned with each other. One of the tubular devices is rotated 180° and the two devices are pushed together. Each device enters the longitudinal slit of the other through the curved-corner entry-way such that the devices become interlocked. The devices can be pushed together to a desired distance, preferably at least half the length, such that the interlocked devices are secured to one another. The devices can be pushed together over substantially the entire length such that the interlocked devices become substantially longitudinally aligned with each other and half of each tubular device is outside and half of each tubular device is inside the other tubular device. This type of interlocking does not excessively squeeze together or force open either device. Rather, each device essentially retains its original size and shape. As described above for a single device, the interlocked devices could also serve as receptacle for storing or carrying items such as folded or rolled-up thin plastic bags, pet leashes, or other types of cords, etc. In this manner, two interlocked handle grips can be as easily transported as one. This unique interlocking feature just described provides a convenient and compact method of carrying a utilitarian package of one or more T-shirt plastic bags and two split tubular devices which may serve as comfortable handle grips. The compact package lends itself to mechanical dispensing. In addition, the T-shirt bags and the split tubular devices could be decorated and distributed as promotion pieces.

A second use for a spring-like split tubular device having overlapping non-cutting longitudinal edges within the scope of the present invention is to provide a handle for attaching to objects to be carried which do not have a built-in handle. For this use, a closed loop member formed from a cord or strap is provided for use in conjunction with the split tubular device. As described above, such a loop member can be easily stored and carried within the chamber of the device. For use, any part of the loop is inserted into the entry-way such that a portion of the loop is within the chamber of the split tubular device while the remaining portions extend from each open end of the split tubular device. A portion of the loop outside the chamber is used to form a half hitch around the object to be carried, i.e., the loop is wrapped in one direction around the object or some convenient portion thereof and the split tubular member is then passed through the loop to form a half-hitch. In this manner, an effective and convenient handle for carrying the object is achieved where none existed previously.

A third use for a spring-like split tubular device having overlapping non-cutting longitudinal edges and which is rigid lengthwise yet flexible in circumference within the scope of the present invention is as a hand-held exerciser for exercising the hand of a user. The user may squeeze and relax the hand around the spring-like split tubular device and the device flexes circumferentially to close around itself. The device is formed of a renitent material which imparts the spring-like quality such that the device will resist the pressure during squeezing and will spring back to substantially its original position during relaxing thus providing exercise for the user's hand.

It is possible to increase the resistance to squeezing by interlocking two, or more, spring-like split tubular devices as described above, i.e., by placing two devices end-to-end with the longitudinal slits and round-cored entry-ways aligned and then rotating one device 180° and pushing the two devices together. Preferably, the devices are pushed together until the devices are substantially longitudinally aligned with each other and half of each tubular device is outside and half of each tubular device is inside the other tubular device.

It is also possible to continue interlocking additional split tubular devices to the ends of interlocked split tubular devices such that the resistance to squeezing is increased even further. In addition, it can be appreciated that split tubular devices having different dimensions, i.e., different outer diameters, boundary wall thicknesses, and lengths, will provide different levels of resistance as well as providing for the comfort of users with different-sized hands. These variously-resistant split tubular devices can be differently colored or otherwise marked with different indicia to enable the user to readily distinguish among them.

A related use for a spring-like split tubular device having overlapping non-cutting longitudinal edges within the scope of the present invention is as a therapeutic hand rehabilitator permitting exercises to be performed which are tailored for a specific individual's diseased or injured hand. Such exercises would likely utilize a number of split tubular devices having differing dimensions. An individual undergoing therapy might, for example, begin by utilizing a relatively large diameter split tubular device and gradually, as hand strength and mobility increased over time, progress to using split tubular devices with smaller diameters. As described above with respect to use as a hand exerciser, multiple split tubular devices could be interlocked to provide increased resistance if desired.

Yet another use for spring-like split tubular devices having overlapping non-cutting longitudinal edges within the scope of the present invention is as a fastener for securely holding a portion of elongate objects such as ropes, straps, or wires in a side-by-side relationship. This is accomplished by inserting a portion of two or more elongate objects through an entry-way and into the chamber of one split tubular device. Preferably, the inside diameter of the tubular device can be selected to closely accommodate the combined diameters of the elongate objects to thereby securely hold the elongate objects. A remaining portion of the elongate objects may be inserted in the same fashion into a second split tubular device preferably having the same diameter as the first tubular device. The two tubular devices are placed end-to-end with the longitudinal slits and curved-corner entry-ways aligned such that the elongate objects are strung sequentially and side-by-side through both aligned chambers. One of the tubular devices is rotated 180° and the two tubular devices are pushed together such that they become interlocked with one another as previously described. In this manner, a portion of the elongate objects are secured in a side-by-side relationship within the two interlocked tubular devices.

A related use for spring-like split tubular devices having overlapping non-cutting edges within the scope of the present invention is as a three-way separator for securing elongate objects such as ropes, straps, or wires. For this use, three or more elongate objects may be placed within the chambers of two split tubular devices preferably having the same diameter such that the elongate objects are separated into three passageways formed between the two interlocked split tubular devices. Although more than three elongate objects may be used, the following description is limited to three objects for illustrative purposes only. A portion of two of the three elongate objects is inserted into the chamber of a first split tubular device. A portion of the third elongate object is inserted in the same fashion into the chamber of the second tubular device. Next, a portion of one of the two elongate objects within the first tubular device adjacent to the portion within the chamber is inserted into the chamber of the second tubular device. In this manner, one of the three elongate objects has adjacent portions passing through both splet tubular devices while a portion of each of the other two elongate objects passes through the chambers of one or the other of the two split tubular devices.

Next, the two tubular devices are placed end-to-end with their longitudinal slits aligned, one tubular device is rotated 180°, and the tubular devices are pushed together slightly. As the devices begin to interlock, however, the tubular devices are pulled apart sideways such that, rather than interlocking in an aligned-within-each-other manner, the two devices interlock in an aligned-side-by-side manner. In this fashion, three separate longitudinal passageways are formed side-by-side within the interlocked devices with a portion of each of the three elongate objects passing through a separate passageway. Viewed end-wise in cross-section, the three passageways, each containing one portion of an elongate object, appear as two crescent moon-shaped passages with an elliptical-shaped passage between.

The present invention also comprises methods of manufacture for spring-like split tubular devices having overlapping non-cutting longitudinal edges with rounded, non-cutting corners forming scissor-like entry-ways at either open end. The preferred method utilizes injection molding techniques. It has been discovered that selection of appropriate material and careful control of the molding parameters produces spring-like split tubular devices which develop the desired degree of overlap of the non-cutting longitudinal edges during the post-mold shrinkage period. Although post-mold as well as in-mold shrinkage are commonly known phenomena, a split tubular molded part would not be expected to shrink in a manner producing overlapping longitudinal edges. Rather, it would be expected that, as shrinkage occurred, the longitudinal edges would, first, abut each other and, if continued shrinkage occurred, the tubular member would either buckle circumferentially such that the abutting longitudinal edges would deform inwardly toward the center of the tubular member or the shrinkage could result in the abutting longitudinal edges shrinking away from each other so as to leave a gap therebetween. It has been discovered that a critical parameter is control of the mold core temperature during the molding step. Contrary to conventional belief that higher mold temperatures result in less post-mold shrinkage, the preferred method in accord with the present invention achieves satisfactory overlap, ie., increased shrinkage, at high mold core temperatures, preferably in the range of 195–210° F.

BRIEF DESCRIPTION OF THE DRAWINGS

In the accompanying drawings, which represent the best mode presently contemplated for carrying out the present invention.

DETAILED DESCRIPTION OF THE PREFERRED EMBODIMENTS

The invention relates to multi-use thin-walled, split tubular devices which are rigid lengthwise yet flexible in circumference wherein all edges are smooth and non-cutting and longitudinal edges along the split overlap each other. Preferably, the edges are all smoothly rounded and each end of the longitudinal edges have rounded, non-cutting corners curved to form scissor-like entry-ways at each open end. The split tubular device is especially useful as a comfortable handle grip which can be attached to various objects having built-in handles or as a handle for attaching to objects to be carried which do not have self-contained handles. Other applications of the novel split tubular devices include use as a hand exerciser or rehabilitator and as a connector for securing elongate objects or holding elongate objects in separate passageways.

Figure 1:
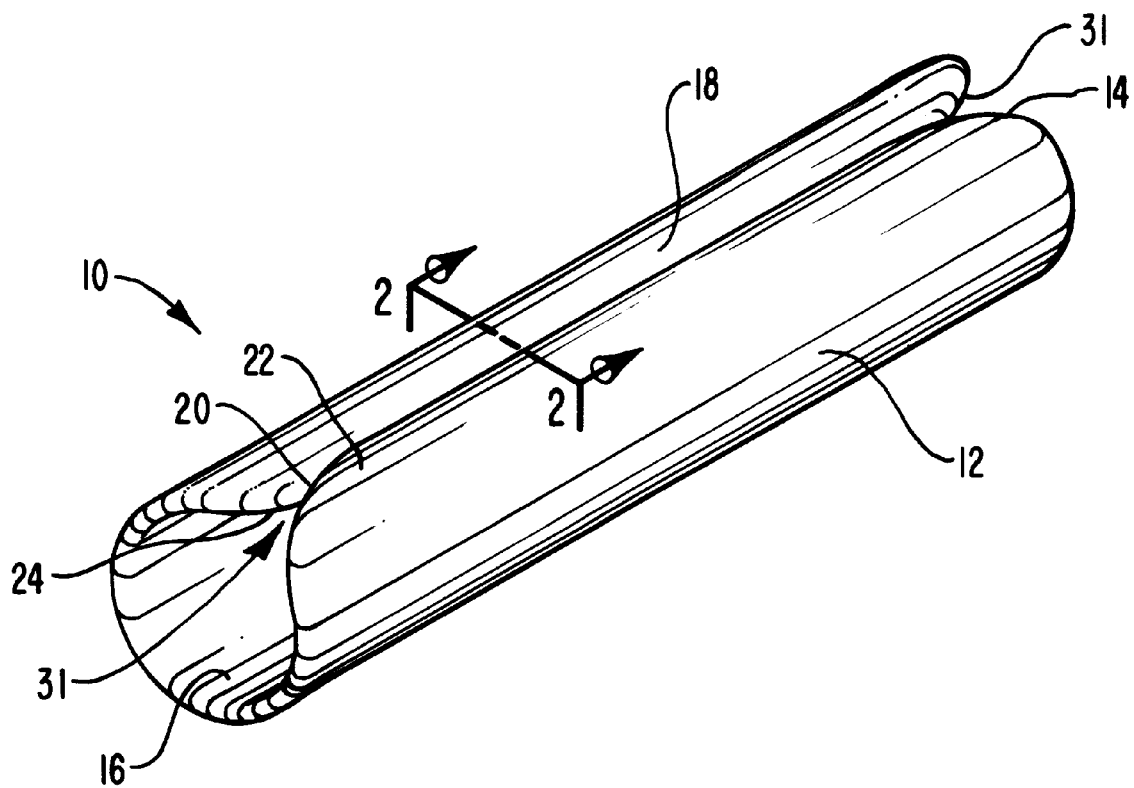
FIG. 1 is a perspective view of one embodiment of a split tubular device in accord with the present invention.

I. General Embodiment of the Spring-like Split Tubular Device Having Non-Cutting Overlapping Longitudinal Edges With Curved Corners Reference is now made to the drawings wherein like parts are designated with like numerals throughout. Referring first to FIGS. 1 and 2, one presently preferred embodiment within the scope of the present invention is illustrated and identified generally by reference numeral 10. Tubular device 10 is comprised of a split tubular member 12 having two ends, designated 14 and 16, and a boundary wall 18. Materials preferred for forming a spring-like split tubular device having rounded overlapping edges in accord with the present invention are thermoplastic injection-moldable, crystalline polymers that shrink in-mold and in post-mold conditions and display high degrees of renitence, flexural endurance, and lateral stiffness. The material is preferably non-toxic and highly durable. It is especially preferred that the material also be abrasion- and water-resistant and be able to accept commercial decorations with long-term adhesion capabilities during rigorous use. For example, the preferred material is a plastic that can be manufactured from a narrow range of polymers in a wide range of colors and can be decorated with known methods such as graphically with lasers that photochemically alter the surface or pad-printed, or hot-stamped or decorated with heat transfer. An example of a suitable material are crystalline polyacetal resins such as Du Pont DELRIN, Hoechst Celanese CELCON, and BASF ULTRAFORM, homopolymer or copolymer. A presently preferred material is DELRIN ACETAL 900 available from Du Pont Chemicals. This product can be pre-colored with numerous selected colors or left in its natural whitish shade. The presently preferred method of decorating is with lasers.

Tubular member 12 preferably has a nominal outside diameter within the range of about ¼ inch to about 3 inches, a length within the range of about ¼ inch to about 10 inches, and a wall thickness within the range of about 0.030 iches to about 0.100 inches. The specific dimensions will depend on the particular application, i.e., end use, contemplated, but should be within the ranges noted for most applications.

As shown in perspective in FIG. 1, a longitudinal slit 20 is formed along the length of tubular member 12 thereby allowing tubular member 12 to be longitudinally opened. Two edges, a first longitudinal edge 22 and a second longitudinal edge 24, are defined by the longitudinal slit 20, and extend the length of the tubular member 12. First longitudinal edge 22 overlaps second longitudinal edge 24. The overlap will preferably be in the range from about ¹⁄₃₂ inch to about ⅜ inch, or more. A chamber 30 (shown in FIGS. 2A and 2B) is defined by the boundary wall 18. Access to the chamber is available through the longitudinal slit 20 and also at either of the two ends 14 or 16. All edges of the device are smooth and non-cutting such that a user's hand and fingers cannot be injured and objects which are inserted into the chamber of the device cannot be damaged.

The longitudinal edges at the two ends are configured to have curved, non-cutting corners designated by reference numeral 31 such that scissor-like entry-ways are formed to facilitate insertion of an object into the chamber. The rounded corner curve radius is preferably within a range of about ½ inch to 1 inch and is most preferably about ⅝ inch. It is most preferable to size the curve proportionately with respect to the radius of the split tubular member such that larger-sized split tubular devices have larger-sized curves to form larger scissor-like entry-ways and thereby facilitate insertion of larger, i.e., thicker, elongate objects. In this manner, items such is hand-held dumbbells or thick briefcase or luggage handles can be conveniently accommodated. Preferably, a curve radius equal to one-half of the outer diameter is used. It should be understood that the curve radius may vary considerably and may even constitute a compact curve, if desired.

One advantage of the overlapping longitudinal edge design is that it avoids pinching the user's hands between the edges of the slit. This is so because the split tubular member can flex and permit the overlapped edges to slide past each other rather than come together in a pinching manner. In a preferred embodiment as shown in FIG. 1, all of the edges of the device are smoothly rounded, most preferably to a radius equal to one-half the wall thickness of the boundary wall. A preferred uniquely designed injection mold results in the entire length of the longitudinal edges, including the curved corner entry-ways, to be smoothly rounded to avoid cutting injuries to a user or damage to objects to be inserted into the chamber of the device. The entire length of each edge is rounded preferably to a radius equal to half the wall thickness of the boundary wall. The smoothly rounded edges ensure that the longitudinal edges slide past each other and overlap during post-mold shrinkage and also ensure the ultimate comfort of the user of the device.

Figure 2A:
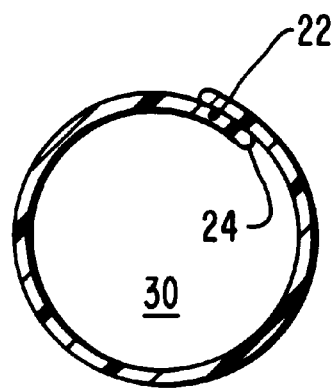
FIG. 2A is a cross-sectional view taken along the line 2—2 of FIG. 1 showing the split tubular device having overlapped longitudinal edges.
Figure 2B:
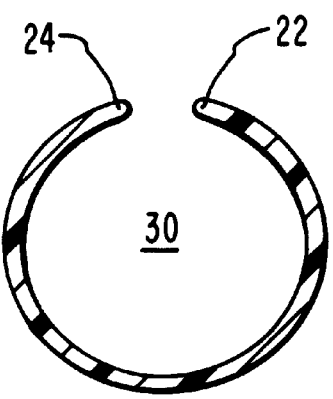
FIG. 2B is a cross-sectional view of the split tubular device shown in FIG. 2A with the overlapped edges pulled open.

As illustrated in the cross-section views of FIGS. 2A and 2B, the most important advantage of the overlapping first and second longitudinal edges, 22 and 24 respectively, is the renitent quality displayed by the thin-walled, split tubular monocoque device that is rigid lengthwise yet flexible in circumference. Accordingly, the device can lose over itself by flexing circumferentially and increasing the overlap of the longitudinal edges. This unique flexibility in circumference allows the overlapping longitudinal edges to be opened up, i.e., separated from each other, when force is applied yet the edges return to the overlapped position when the force is removed. The open position is shown in FIG. 2B where it can be seen that longitudinal edges 22 and 24 have been separated from each other by an applied force and are no longer overlapped. In this position, an elongate object may be inserted between the edges and into the chamber. It will be appreciated that the amount of separation between the longitudinal edges will be affected by the outer diameter of the tubular device such that the longitudinal edges of devices having larger outer diameters can be separated farther than the longitudinal edges of devices having smaller outer diameters. The unique flexibility of the split tubular device, however, allows the longitudinal edges to return to substantially the original overlapped position, as shown in FIG. 1, when the applied force is relaxed. This return to the original position is best seen in FIG. 2A, taken along line 2—2 in FIG. 1. Moreover, similar to a spring, the split tubular device is capable of being flexed "open" repeatedly and continually returning to substantially the original position.

II. Use Of The Spring-Like Split Tubular Device As A Handle Grip

A split tubular device in accord with the present invention has a variety of applications. The dimensions of the device and the material used may differ depending upon the specific application desired. Moreover, for some applications, a multiple of tubular devices may be used in combination.

Figure 3:
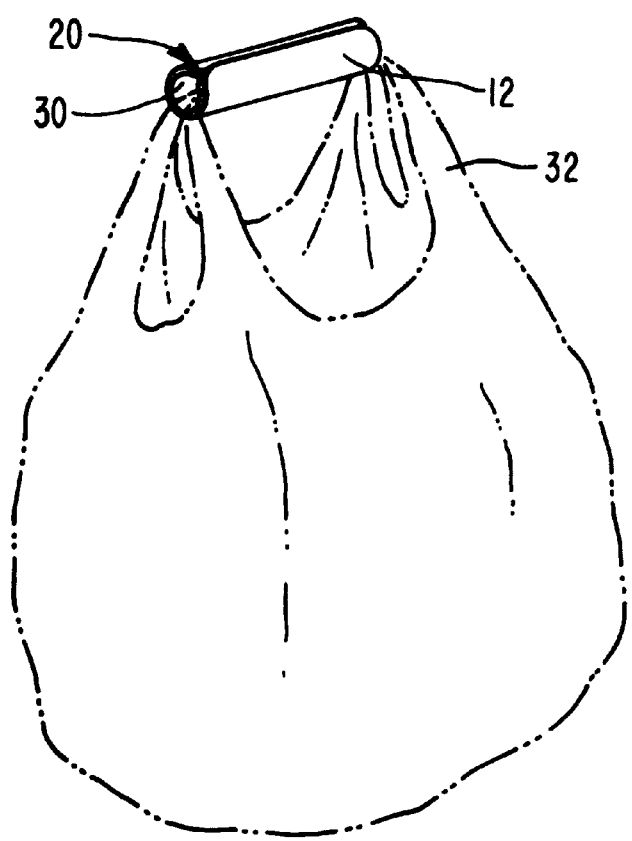
FIG. 3 depicts the handle grip engaged with the self-contained handle of a plastic T-shirt bag.

As illustrated in FIG. 3, one application within the scope of the present invention is use of the split tubular device as a handle grip. For this application, the split tubular device is fashioned in sizes permitting comfortable and convenient gripping by users. The handle grip is used to facilitate carrying of carrying articles having built-in handles such as plastic T-shirt bags, pails, canvas or string bags, briefcases, backpacks, and luggage. In the following description, plastic T-shirt bags will be used as an exemplary carrying article but it should be appreciated that use of the present invention as a handle grip for other types of carrying articles is comparably achieved.

The handles of plastic T-shirt bags are loops made of thin plastic through which the user'hand is placed. Unfortunately, when the load within the bag is heavy, the loop handles tend to dig into the hands of the user thereby causing discomfort and possible injury. Use of the present invention as a handle grip for carrying plastic T-shirt bags, however, avoids these problems.

As shown in FIG. 3, the loop handles 32 of a plastic T-shirt bag have been inserted through one of the non-cutting scissor-like entry ways and pulled through the longitudinal slit 20 into the chamber 30 within the split tubular member 12. Because of the overlapping longitudinal edges, the handles remain securely within the chamber and cannot be inadvertently released. The unique smoothly rounded, non-cutting, curved-cornered scissor-like entry-ways of the present invention permit easy use by users having healthy or impaired hands and also by sight-impaired users having tactile abilities. When used as a handle grip, the ergonomic design, composition and method of construction allows a built-in handle of a carrying article to be easily inserted through a scissor-like entry-way and the longitudinal slit. The handle will be retained within the chamber of the split tubular device even when the handle grip is released by the user. Indeed, the handle will be retained until such time as the user removes the handle from within the chamber. This is easily accomplished by reversing the procedure for insertion.

It can be appreciated that the added comfort of using the tubular device of the present invention as a handle grip is also evident when carrying or holding other objects such as briefcases, suitcases, pails, baskets, pet leashes, and small items such as lightweight exercising dumbbells.

Additionally, it will be appreciated that the chamber of the spring-like split tubular device of the present invention can also serve as a receptacle for holding items such as, for example, one or more folded or rolled-up plastic T-shirt bags or other thin film bags. Because these plastic T-shirt bags are constructed of a very thin polymer film, they can be folded or rolled very tightly to fit inside the tubular device. Thus, a user can easily transport bags for later use with the handle grip as a small, compact package carried in a pocket or purse. Other suitable items include pet leashes or other types of straps or cords which can be folded or rolled to fit within the chamber.

Figure 4:
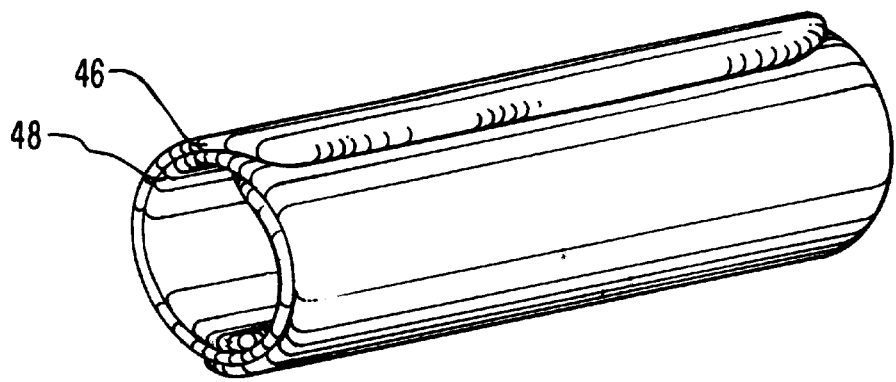
FIG. 4 is a perspective view of two split tubular devices interlocked with each other.

It is also possible to form a convenient package out of two of the spring-like split tubular devices as shown in FIG. 4. Two split tubular devices having the same diameter, designated by reference numerals 46 and 48, can be placed end to end with the longitudinal slits and curved-corner entry-ways aligned with each other. One of the tubular devices is rotated 180° and the two devices are pushed together. Each device enters the longitudinal slit of the other through the curved-corner entry-way such that the devices become interlocked. The devices can be pushed together to a desired distance, preferably at least half the length, such that the devices are securely interlocked with one another.

As shown in FIG. 4, the devices can be pushed together over substantially the entire length such that the interlocked devices become substantially longitudinally aligned with each other such that half of each tubular device is outside and half of each tubular device is inside the other tubular device. This type of interlocking does not excessively squeeze together or force open either of the two device. Rather, each device essentially retains its original size and shape.

As described above for a single tubular device, two interlocked tubular devices could also provide a convenient storing and carrying receptacle for items such as folded or rolled-up thin plastic bags or pet leashes, etc. In this manner, two handle grips can be easily transported for later use with enclosed bags as a single compact package. Accordingly, this unique interlocking feature provides a convenient and compact method of carrying a utilitarian package of one or more T-shirt plastic bags and two split tubular devices which may serve as comfortable handle grips. The compact package lends itself to mechanical dispensing. In addition, the T-shirt bags and the split tubular devices could be decorated and distributed as promotion pieces.

III. Use Of The Spring-Like Split Tubular Device As An Attachable Handle

Figure 5:
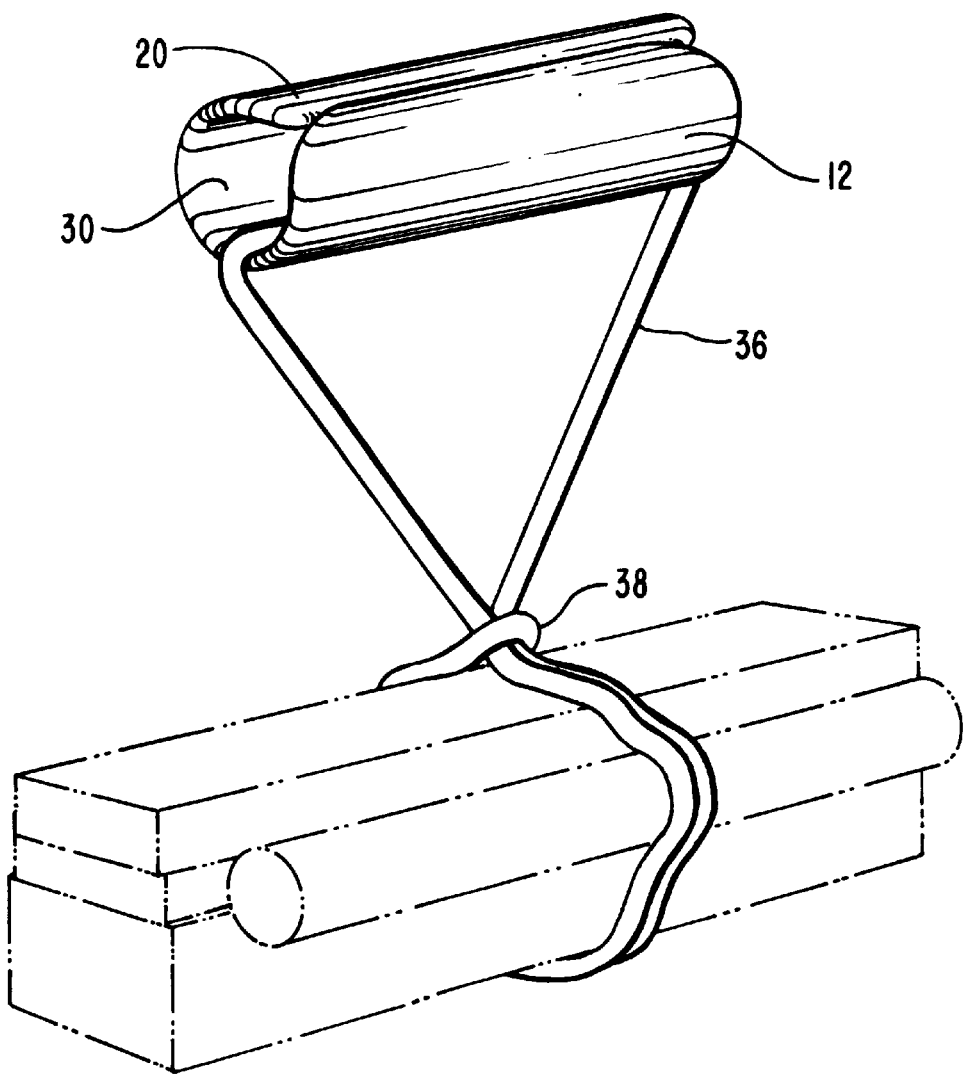
FIG. 5 is a perspective view of a split tubular device being used as an attachable handle for a bundle of objects.

A second application of a split tubular device in accord with the present invention is depicted in FIG. 5. This embodiment is primarily intended for use as an attachable handle to be used with objects that do not have a built-in handle, such as boxes, bundles, equipment, etc. As depicted, this embodiment comprises a split tubular member 12 and an endless loop member 36. Tubular member 12 may be the same as described above for the detachable handle grip. Endless loop member 36 is preferably a cord, but may comprise a rope, a string, a wire, a strap, or other similar item.

An example of the use of this embodiment is depicted in FIG. 5, which shows the split tubular member and endless loop member in use as an attachable handle for carrying a bundle of objects. As shown, a portion of the endless loop member 36 is inserted through longitudinal slit 20 and into the chamber 30 within the split tubular member 12 as described above for plastic T-shirt bag handles. The portion of the endless loop member that is outside the tubular member can be gathered together and wrapped around the object to be carried such that a closed loop end 38 extends beyond the object. The tubular member 12 is then passed through the closed loop end 38 and pulled to tighten the endless loop member around the bundle of objects to be carried, thus effecting an equivalent half-hitch, as shown in FIG. 5. In this manner, objects without handles may be carried simply and conveniently.

Figure 6:
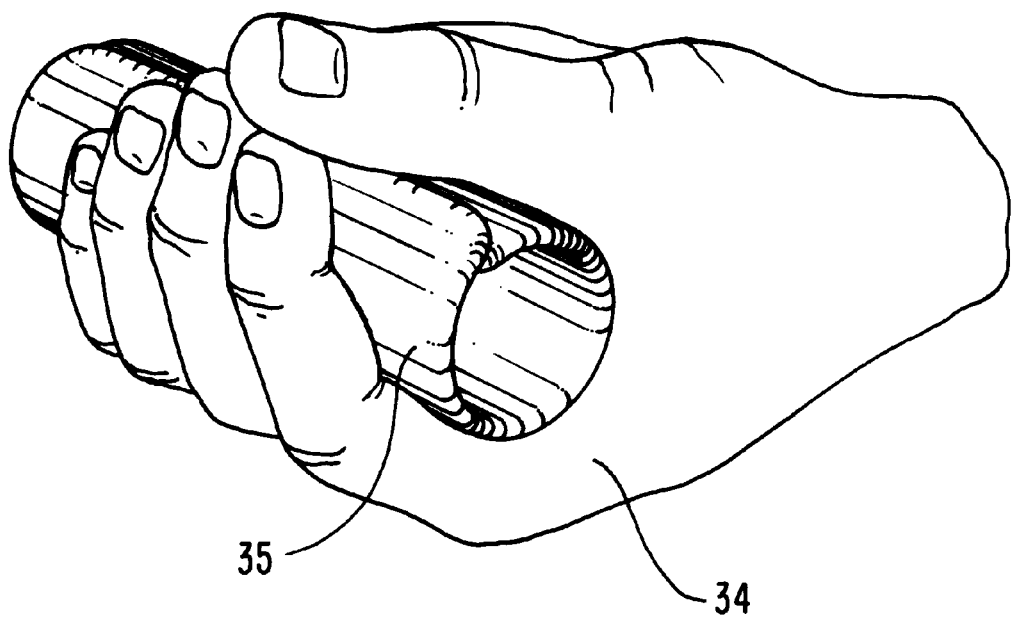
FIG. 6 is a perspective view of a split tubular device being used as a hand exerciser or rehabilitator.

IV. Use Of The Spring-Like Split Tubular Device As A Hand Exerciser Or Rehabilitator Other applications of a split tubular device in accord with the present invention are as a hand exerciser or a hand rehabilitator for injured or diseased hands. For these applications, the user would squeeze the split tubular member in his or her hand repeatedly in order to exercise the hand as illustrated in FIG. 6 where a user's hand 34 is shown squeezing split tubular device 35. Because of the renitent property of the material, the split tubular device will resist the pressure of squeezing and will spring back into the original shape after each squeeze thus providing exercise. Variously-sized split tubular devices could be used to provide a variety of resistance levels. The user may choose to squeeze the tubular members separately or may interlock two tubular members as previously described to increase the squeezing resistance to a desired level. It will be appreciated that it is possible to interlock multiple tubular members and to vary the degree of longitudinal alignment and the relative positions of the slits to also selectively vary the length and resistance within an interlocked set of tubular devices. This allows for the exercise or rehabilitation therapy to be individually tailored to hand size and abilities. It may be desirable, particularly for hand rehabilitation, to progressively increase the resistance level over time.

For these applications, the outer diameter of the split tubular devices may be within the range of about 1 inch to about 6 inches, the length within the range of about 2 inches to about 6 inches, and the wall thickness be within the range of about 0.025 inches to about 0.10 inches. The different sizes could be differently colored or marked with indicia to permit the user to readily distinguish one from another. The differently-sized devices could conveniently be provided in sets of, for example, five or more pairs of split tubular devices.

V. Use Of The Spring-Like Split Tubular Device As A Fastener or Separator

Figure 7:
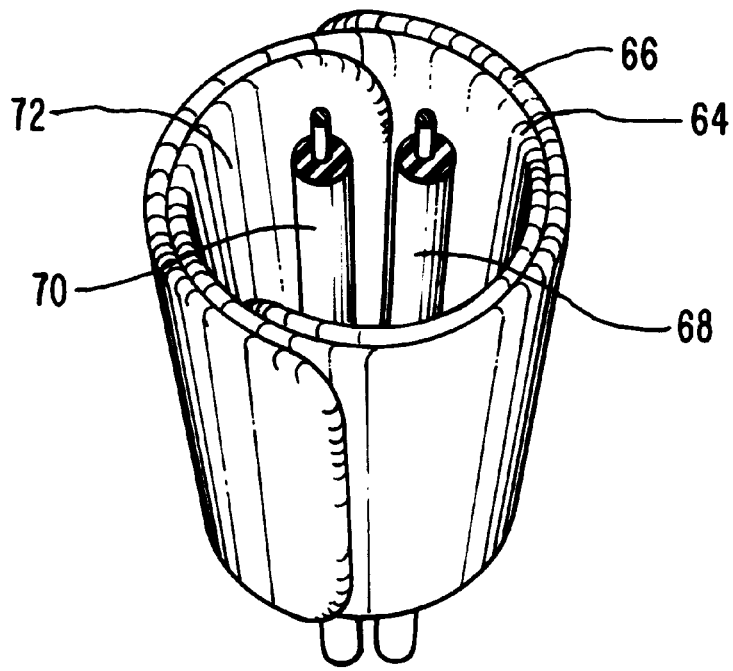
FIG. 7 is a perspective view of two interlocked split tubular devices being used as a fastener to secure two elongate objects in a side-by-side relationship.
Figure 8:
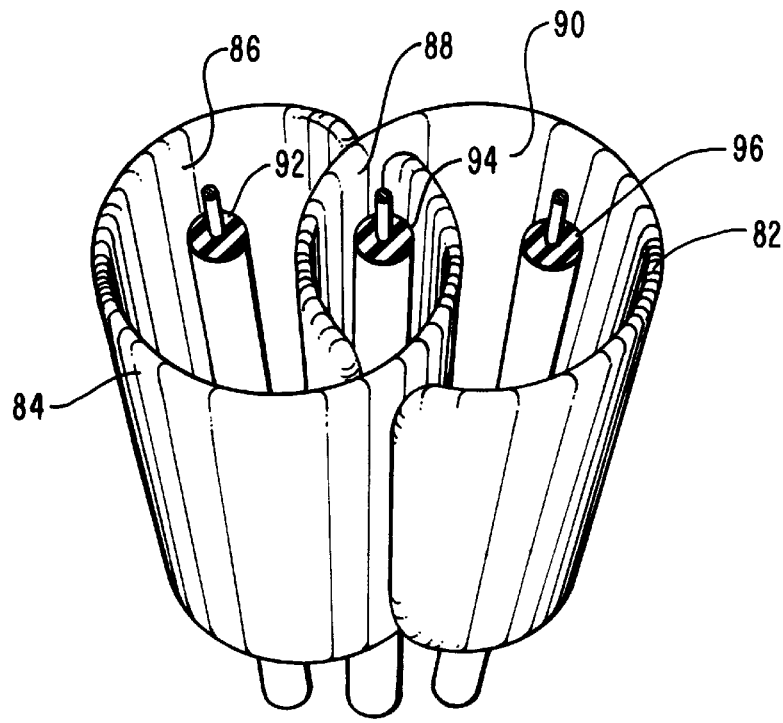
FIG. 8 is a perspective view of two interlocked split tubular devices being used as a three-way separator to secure three elongate objects in a separated but side-by-side relationship.

Other applications of a split tubular device in accord with the present invention are as a fastener or separator for elongate objects which can be positioned within the chamber. These applications are illustrated in FIGS. 7 and 8. One or more of the split tubular devices may be used as a no-tools fastener for securely fastening together, or positioning in a side-by-side relationship, two or more elongate objects such as wires, cords, ropes, netting, or other items. In addition, two split tubular devices can be interlocked to form three separate chambers to permit separation of elongate objects.

As shown in FIG. 7, two split tubular devices, interlocked as illustrated in FIG. 4, can be used to form a sturdy and secure chamber for bundling together two or more elongate objects. This is accomplished by inserting a portion of the two or more elongate objects, designated by reference numerals 68 and 70, into the chambers of two split tubular devices aligned end to end with the longitudinal slits circumferentially displaced approximately 180° from each other. The split tubular devices are then pushed together such that each of the aligned ends enter the curved-corner entry-way of the other device to thereby interlock the devices. In this manner, as illustrated in FIG. 7, the elongate objects are secured in a side-by-side position within the chamber 72 of the interlocked tubular devices, designated by reference numerals 64 and 66.

A split tubular device used as three-way separator is illustrated in FIG. 8. For this use, three or more elongate objects may be placed within the chambers of two split tubular devices having the same diameter such that the elongate objects are separated into three passageways formed between the two interlocked split tubular devices. Although more than three elongate objects may be used, the following description is limited to three objects for illustrative purposes only. A portion of two of the three elongate objects is inserted into the chamber of a first tubular device according to the method previously described. A portion of the third elongate object is inserted in the same fashion into the chamber of the second tubular device. Next, a remaining portion of one of the two elongate objects within the first tubular device is also inserted into the chamber of the second tubular device. The two tubular devices are placed end-to-end with their longitudinal slits aligned, one tubular device is rotated 180°, and the tubular devices are pushed together slightly. As the devices begin to interlock, however, the tubular devices are pulled apart sideways such that, rather than interlocking in an aligned-within-each-other manner, the two devices interlock in an aligned-side-by-side manner. The devices can then be pushed toward each other to substantially align longitudinally and provide a sturdy and secure interlock. In this fashion, three separate longitudinal passageways are formed side-by-side within the interlocked devices with a portion of each of the three elongate objects passing through a separate past gatway. Viewed end-wise in cross-section, the three passageways, each containing one portion of an elongate object, appear as two crescent moon-shaped passages with an elliptical-shaped passage between.

As shown in FIG. 8, the three-way separator comprises two split tubular devices 82 and 84 and three elongate objects such as the wires designated by reference numerals 92, 94, and 96. Wires 92 and 94 were inserted into the chamber 86 of split tubular device 84. Wire 96 was inserted into the chamber 90 of split tubular device 82. Next, the split tubular devices were aligned end to end with the longitudinal slits approximately 180° apart and a portion of wire 94 inserted into the chamber 90 of split tubular device 82. Accordingly, wire 92 was within the chamber 86 of split tubular device 84 only and wire 96 was within the chamber 90 of split tubular device 82 only while portions of wire 94 were within the chambers of both of the split tubular devices. The split tubular devices were pushed together slightly such that the end of each began to enter the entry-way of the other and then the split tubular devices were pulled apart sideways and aligned in a side-by-side manner as shown to form a third chamber 88. The devices are pushed toward each other to substantially align longitudinally and provide a sturdy and secure interlocked three-chambered device as shown. The renitent properties of the material will cause them to remain in such an interlocked position. The split tubular devices can be disengaged and used again or, if desired, the interlocked split tubular devices can be secured together in a more permanent fashion such as with glue or other conventional means.

VI. Method of Making Spring-Like Split Tubular Devices

The present invention also comprises methods of manufacture for spring-like split tubular devices having non-cutting overlapping longitudinal edges with corners curved in a manner that forms a scissor-like entry-way. The preferred method utilizes injection molding techniques. It will be appreciated that other methods could also be used.

For example, extruded tubes or solid rods which can be drilled into tubes, having the selected outer diameter and uniform boundary wall thickness formed from a suitable plastic such as polyacetal could be used. A carefully-controlled laser could be used to cut a longitudinal slit and round the corners of the longitudinal edges thereby formed. Laser cutting provides smooth substantially flat edges that are non-cutting. The edges can be rounded, if desired, in a secondary process such as polishing. Proper selection of non-annealed material will result in a device wherein the longitudinal edges will overlap as desired. Alternatively, it would be possible to expose conventional molded split tubular devices to an externally-applied squeezing force to create overlap of the longitudinal edges.

It has been discovered, however, that the preferred embodiment of the present invention wherein every edge of the longitudinally split tubular device is smoothly rounded to a radius equal to one half the wall thickness can be injection molded with a uniquely designed mold form. Moreover, the devices molded according to the preferred method surprisingly do not require the application of any external force following the molding process to create the desired overlap of the longitudinal edges. In particular, it has been discovered that selection of appropriate material and careful control of the molding parameters produces spring-like split tubular devices which develop the desired degree of overlap of the non-cutting longitudinal edges during the post-mold shrinkage period.

Preferred injection molding materials are crystalline polyacetal resins such as Dupont DELRIN, Hoechst Celanese CELCON, and BASF ULTRAFORM, homopolymer or copolymer. The presently preferred material is DELRIN ACETAL 900 available from Du Pont Chemicals. Acetal resins are noted for high strength and rigidity, fatigue endurance unmatched by most other plastics, ease of fabrication high resistance to repeated impacts, resilience, good wear resistance and a low coefficient of friction. Most important for manufacturing the end product is processability. Acetal is a crystalline resin. In the molten stage, the polymer molecular chains are in a disordered mass. When the polymer solidifies, the chains form a more orderly and dense crystalline arrangement. Complete crystallization is not possible, but, the slower the cooling, the greater the degree of crystallinity achieved. With increasing crystallization, density and shrinkage also increase.

To meet specified tolerances in molding, consideration must begin with the design of the mold. The mold assumes greater importance in this respect, as the number of cavities is increased. For a multi-cavity system, each cavity must be identical to the others. The cavity gate must be sized carefully and precisely machined to assure that each cavity will be filled with the identical amount of resin. The gate location may also be critical to insure filling all parts of the cavity at a uniform rate. The mold runner channels must also be designed so that the resin flow to all cavities is as uniform as possible. Since in-mold shrinkage depends so much upon a uniform freezing rate, the mold temperature should be the same on all surfaces of all the cavities.

Contrary to industry practice, very fine tolerances are required across parting lines and dimensions controlled by movable cores to produce acceptable split tubular devices as described herein having all edges rounded to a radius equal to half the wall thickness and longitudinal edge corners curved in a manner that forms a non-cutting scissor-like entry-way. Injection molding a split tubular device to have overlapping edges is not usual in the industry. It has been discovered that, by rounding the edges to a radius equal to half the wall thickness, intentional post-mold shrinkage allows the opposing longitudinal edges to close and slide past each other and thereby become overlapped. If the longitudinal edges are not rounded but are left square, post-mold shrinkage will typically result in the opposing longitudinal edges shrinking toward each other to thereby abut against each other rather than overlapping each other.

The injection molding process may be considered as a steady-state operation interrupted regularly at an accurately controlled timed sequence. To depart from accurate timing or uniformity in any of the processing variables upsets the steady-state conditions, which results in poor shot-to-shot and part-to-part reproducibility. Consequently, it is imperative that specific operating variables be controlled as closely as possible. This includes maintaining constant such factors as injection cylinder and mold temperatures, injection speed, pressure and overall cycle including each individual portion of the cycle. The part weight must remain constant, requiring uniformity of the weight of each shot.

For illustrative purposes and not by way of limitation, the desired overlap for a split tubular device to be used as a handle grip is preferably about 0.200–0.270 inches and the wall thickness is preferably about 0.050 inches. For a split tubular device to be used as a hand exerciser, the overlap is preferably about 0.300–0.375 inches and the wall thickness is preferably about 0.060 inches. Once cooled, the longitudinal edges of the split tubular device will remain overlapped indefinitely and will display a renitent characteristic. Other wall thicknesses for other applications of the split tubular devices may be desired and may be obtained by optimizing many process variables.

Figure 9A:
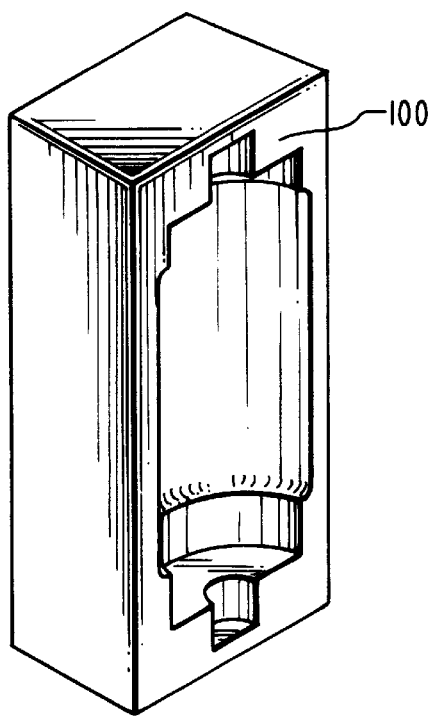
FIG. 9A is a perspective view of a first mold cavity for use in a preferred method of making a split tubular device in accord with the present invention.
Figure 9B:
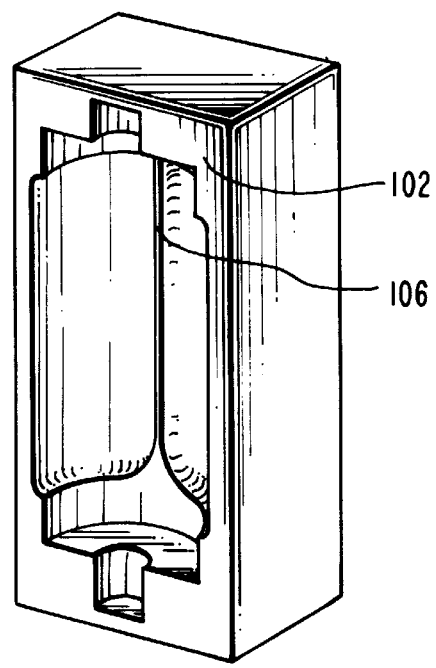
FIG. 9B is a perspective view of a second mold cavity for use in a preferred method of making a split tubular device in accord with the present invention.

A preferred method of producing a split tubular device that is laterally rigid, flexible in circumference with overlapping longitudinal edges having corners curved in a manner that forms a non-cutting scissor-like entry-way at each end, having smooth inner and outer surfaces and with all edges rounded to a radius half the wall thickness in the finished product requires a uniquely designed injection mold form. As shown in FIGS. 9A and 9B, uniform outer diameter requires two mating mold cavities, designated with reference numerals 100 and 102. Each mold cavity is configured to form half of the outside diameter of the split tubular device. Parting lines where the two mold cavities come together must be carefully configured to substantially precisely match-up when the cavities come together and thereby ensure the molded split tubular device will have a smooth and user-friendly surface. In addition, the entire mold form must be carefully machined and all edge radii meticulously polish finished to ensure precise match-up along every parting line and thereby ensure that all edges of the device are smoothly rounded to one-half the radius of the wall thickness.

As can be seen in FIG. 9A and 9B, the two mold cavities are dissimilar in design. FIG. 9A illustrates a first mold cavity 100 which produces a uniform, i.e., non-split, wall. Part of the split of the tubular device is realized by a unique longitudinal separator 106, illustrated in FIG. 9B. The longitudinal separator is preferably formed by careful and precise machining of the second mold cavity 102, representing the half of the outside diameter of the split tubular device containing the longitudinal slit. The longitudinal separator 106 machined lengthwise into the second mold cavity represents substantially one half of the depth of the longitudinal slit to be molded into the device. The second half of the depth is formed by the mating longitudinal separator 108 machined into the mold core piece and illustrated in FIG. 10.

Figure 10:
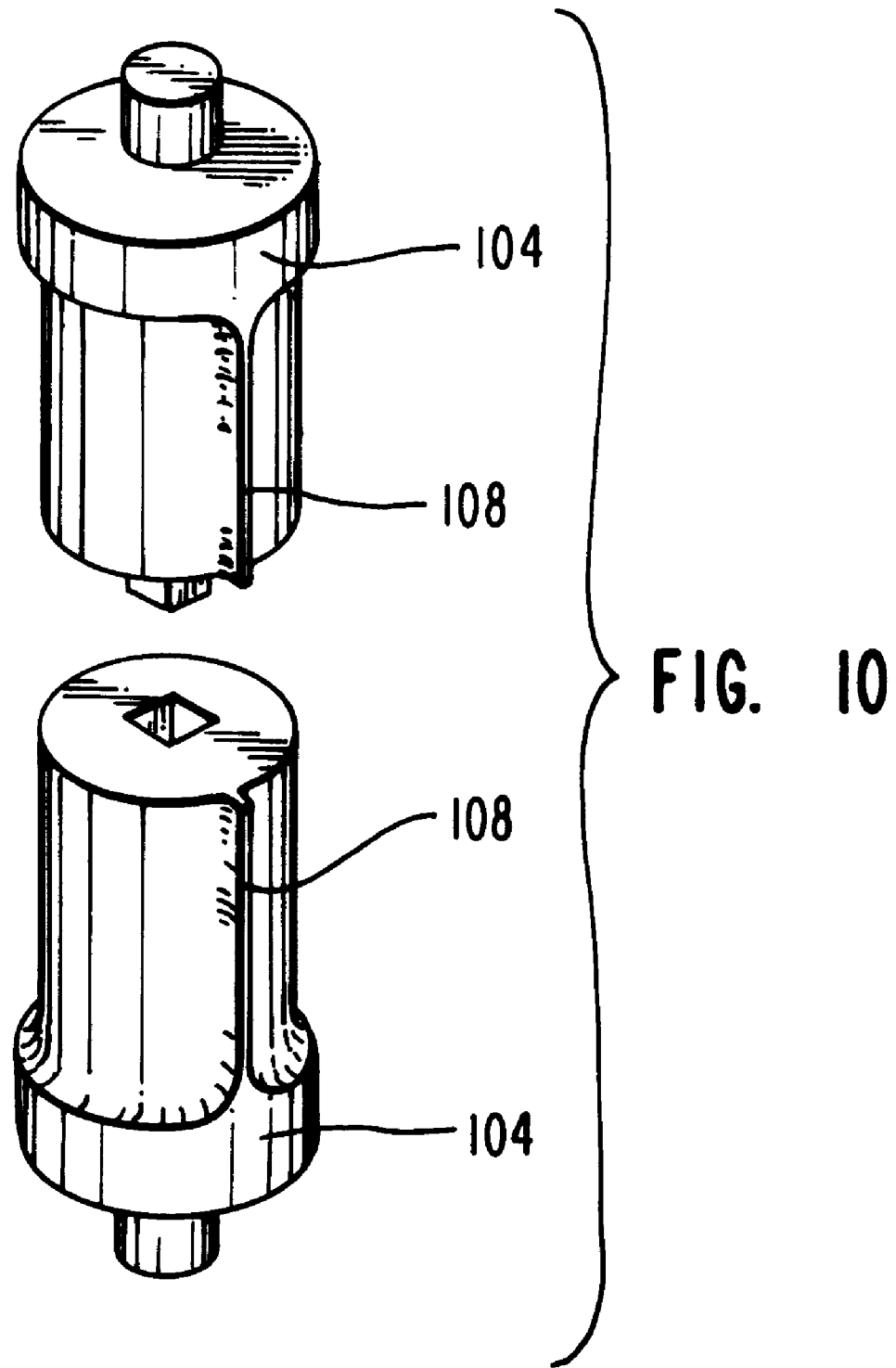
FIG. 10 is a perspective exploded view of a mated mold core piece for use in a preferred method of making a split tubular device in accord with the present invention.

As shown in the exploded perspective view of FIG. 10, a mated mold core piece 104 is formed from two mating members and is sized and shaped to fit between the two mold cavities shown in FIGS. 9A and 9B to thereby form the complete inside and outside diameters of the split tubular device having uniform wall thickness between the cavities and core piece. Again, the match-up between the mated mold core piece 104 and the mold cavities must ensure smooth inner and outer surfaces, smooth non-cutting edges, and uniform wall thickness throughout the split tubular device. The mated mold core piece 104 permits separation of the two mating members to facilitate removal of the molded tubular device. The two mating members of mated mold core piece 104 are preferably mounted on retractable supports or other conventional means for effecting easy separation of the mating members following the molding process such that the molded tubular device is easily removed. Preferably, the entire process is automated such that, following the injection molding process, the mold cavities separate, the two mating members of the mated mold core piece retract, and the molded device is released from the mold form. It will be appreciated that the match-up between the two retractable mating members of the mated mold core piece is critical and must be precisely controlled. Preferably, conventional mating control means, such as, for example, an alignment key configuration as shown in FIG. 10, can be used to ensure precise alignment of the mating members.

As seen in FIG. 10, the mated mold core piece 104 is formed with a longitudinal separator 108 correspondingly sized and shaped to substantially precisely align with longitudinal separator 106 (shown in FIG. 9B). This longitudinal separator is also preferably formed by careful and precise machining of each mating member of the mated mold core piece 104 such that the separator 108 represents the second half of the depth of the longitudinal slit to be molded into the device. The longitudinal separator 108 of the mated mold core piece 104 and the longitudinal separator 106 of the second mold cavity 102 are sized and shaped such that, when aligned during the molding process, the split tubular device produced therebetween will have longitudinal edges smoothly rounded to a radius equal to half the split tubular device wall thickness. It will be appreciated by those of skill in the art that such precise match-up requires meticulous machining and polish finishing.

Also as shown in FIGS. 9A, 9B and 10, the mold cavities and mated mold core piece are machined to produce end edges which are also smoothly rounded to a radius equal to half the split tubular device wall thickness and to produce corners at the end of the longitudinal edges which are curved in a manner that forms a scissor-like entry-way. The rounded corner curve radius for each corner is preferably within a range of about ½ inch to 1 inch and is most preferably about ⅝ inch. It may be desired to size the rounded corner curve radius proportionately with respect to the outer diameter of the split tubular member such that larger-sized split tubular devices have larger-sized curves to facilitate insertion of larger, i.e., thicker, elongate objects. Preferably, a curve radius equal to one-half of the outer diameter is used. Accordingly, for purposes of illustration and not limitation, a split tubular device having a 1.000 inch outside diameter might have a mold cavity curve radius at each of the four rounded corners of the finished split tubular device, equal to 0.500 inches. Incremental 0.250 inch increases of the outside diameter would increase the mold cavity rounded-corner curve radius at each of the four rounded corners equal to an increment of 0.125 inch. The length of the injection molded split tubular device could be from less than 1.00 inch to about 10.00 inches. It should be understood that the dimensions for various applications may be different. For example, the preferred length for use as a handle grip may be about 3 to 5 inches to comfortably fit across a user's palm.

The mating longitudinal separators of the mated mold core piece and the mold cavity are preferably machined to produce a minimum separation of about 0.040 inches across to prevent distortion from molding pressures and to align with a maximum tolerance of about plus or minus 0.0005 inch. It has been discovered that selection of appropriate material and careful control of the molding parameters produces spring-like split tubular devices which develop the desired degree of overlap of the rounded longitudinal edges during the post-mold shrinkage period. In-mold and post-mold shrinkage of the injection molded resin, combined with the unique design of the mold form, produce the split tubular devices having smoothly rounded overlapping edges with curved corners forming scissor-like entry-ways at either open end. Accordingly, sizing the mold cavities and mated mold core pieces requires allowance for both in-mold and post-mold shrinkage. In-mold shrinkage is the difference in size between the cavity at room temperature and the molded part soon after it has cooled to room temperature, usually within one hour. In-mold shrinkage is dependent on such factors as mold temperature, injection pressure, screw forward time, melt temperature, gate size and part thickness. Post-mold shrinkage is irreversible and is determined by the cooling rate, that is, the mold temperature, part size, and thickness.

Although post-mold as well as in-mold shrinkage are commonly known phenomena, a split tubular molded part would not be expected to shrink in a manner producing overlapping longitudinal edges. Rather, it would be expected that, as shrinkage occurred, the longitudinal edges would, first, abut each other and, if continued shrinkage occurred, the tubular member would buckle circumferentially such that the abutting longitudinal edges would deform inwardly toward the center of the tubular member. Another possibility would be that the continued shrinkage would cause the longitudinal edges to spread open and away from each other.

It has been discovered that a critical parameter is control of the mold core piece temperature during molding. It is also important to ensure rapid removal of the molded split tubular device from the mold core piece. Contrary to conventional belief that higher mold temperatures result in less post-mold shrinkage, the preferred method in accord with the present invention achieves satisfactory overlap, i.e., increased shrinkage, at high mold core piece temperatures, i.e., 195–210° F. Either non-overlapping or unsatisfactorily-overlapping split tubular devices result from lower mold core piece temperatures.

It should be understood that molding parameters are routinely varied to achieve the steady-state conditions which give the desired results. In this manner, the desired shot-to-shot reproducibility is achieved. For illustrative and not restrictive purposes, however, the following example describes injection molding set-up information which produced acceptable split tubular devices:

SET-UP:

| | |
|---|---|
| Machine: | Cincinnati Milacron 110 (Tons Clamp Cap) |
| Shot Capacity | 7 oz. |
| Shot Size Used | 2 oz. |
| Material | DELRIN ACETAL 900P Natural/Black |
| Barrel Temp. | 390–400° F. (Molten Resin) |
| Mold (Cavity) Temp. | 130° F. Controlled |
| Mold (Core) Temp. | 195–210° F. |
| Mold Cooling Time | 8–10 Seconds |

The mold cavities and mated mold core piece were designed as described above with respect to FIGS. 9A, 9B, and 10. One mold cavity was stationary and one was movable. The mating members of the mated mold core piece were mounted on movable core supports such that the mold core piece could be positioned between the two mold cavities during the injection molding and ejected to a position outside of the mold cavities following molding. In this manner, following molding, the mold cavities are separated and the hot mold core piece is ejected. Next, a hot mating member with the hot molded split tubular device attached is rapidly separated from the core support. The hot molded split tubular device is then quickly removed from the mating member even though the inner diameter of the device is uniform over the entire length. In-mold shrinkage results in tightening of the hot molded tubular device on the mold core piece and some shrinkage of the hot molded tubular device away from the longitudinal slit. Because of the lubricity of the material, however, the hot split tubular device is easily removed from the hot mating member. As the devices cool, post-mold shrinkage causes the split tubular devices to continue to shrink in circumference. The longitudinal edges rounded to a radius equal to half the wall thickness first approach and then slip past each other such that the desired overlap of the longitudinal edges develops.

It should be understood that automated injection molding techniques may preferably be used in accord with the present invention as well. Advantages include increased speed of production and consistency of product.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An injection molding method for making a spring-like split tubular device, the method comprising the steps of:

(a) selecting a material capable of injection molding, said material having renitent properties when molded;

(b) obtaining a mold form capable of producing a spring-like split tubular device comprising a tubular member of a selected outer diameter having two end edges, a boundary wall of uniform thickness, a longitudinal slit formed along the length of said tubular member defining a first and second longitudinal edge, each of said first and second longitudinal edge having curved end corners, and a chamber defined by said boundary wall and accessible from the two ends or through the longitudinal slit, wherein said end edges and said longitudinal edges are smoothly rounded to a radius equal to one-half the thickness of the boundary wall, said mold form comprising:

(1) a mold cavity; and (2) a mold core piece;

(c) injecting a selected quantity of the selected material at a selected temperature and pressure into the mold form;

(d) molding for a selected period of time while the temperature of said mold cavity and said mold core piece is controlled within selected ranges;

(e) removing said molded material from said mold form; and (f) permitting said molded material to cool and thereby cause said first longitudinal edge to overlap said second longitudinal edge and said curved corners to form scissor-like entry-ways at each of said ends of the split tubular device.

2. A method as defined in claim 1 wherein the curved end corners on the longitudinal edges have a curve radius of one-half the selected outer diameter of the split tubular device.

3. A method as defined in claim 1 wherein the curved end corners on the longitudinal edges have a curve radius within the range of about 1/8 to about 1 inch.

4. A method as defined in claim 1 wherein the cooling step (f) results in the first longitudinal edge overlapping the second longitudinal edge in a range of about 1/32 to about 3/8 inch.

5. A method as defined in claim 1 wherein the cooling step (f) results in an outside diameter for the tubular member within the range of about 1/4 to about 3 inches.

6. A method as defined in claim 1 wherein the cooling step (f) results in a length of the tubular member within the range of about 1/4 to about 10 inches.

7. A method as defined in claim 1 wherein the cooling step (f) results in a thickness of the boundary wall within the range of about 0.025 to about 0.100 inch.

8. A method as defined in claim 1 wherein the selected material is a crystalline polyacetal resin.

9. A method as defined in claim 1 wherein the mold form core piece temperature is within the range of about 195–210° F.

10. A method as defined in claim 9 wherein the mold cavity temperature is about 130° F.

11. A method as defined in claim 10 wherein the selected time period in step (d) is about 8–10 seconds.

* * * * *